(12) United States Patent
Niell et al.

(10) Patent No.: US 9,767,026 B2
(45) Date of Patent: Sep. 19, 2017

(54) PROVIDING SNOOP FILTERING ASSOCIATED WITH A DATA BUFFER

(71) Applicant: Intel Corporation, Santa Clara, CA (US)

(72) Inventors: Jose S. Niell, Franklin, MA (US); Daniel F. Cutter, Maynard, MA (US); James D. Allen, Austin, TX (US); Deepak Limaye, Austin, TX (US); Shadi T. Khasawneh, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1047 days.

(21) Appl. No.: 13/997,437

(22) PCT Filed: Mar. 15, 2013

(86) PCT No.: PCT/US2013/031838
§ 371 (c)(1),
(2) Date: Jun. 24, 2013

(87) PCT Pub. No.: WO2014/142939
PCT Pub. Date: Sep. 18, 2014

(65) Prior Publication Data
US 2014/0281197 A1  Sep. 18, 2014

(51) Int. Cl.
*G06F 12/08* (2016.01)
*G06F 12/10* (2016.01)
(Continued)

(52) U.S. Cl.
CPC ...... *G06F 12/0831* (2013.01); *G06F 12/1027* (2013.01); *Y02B 60/1225* (2013.01)

(58) Field of Classification Search
CPC ............ G06F 12/0831; G06F 12/1027; G06F 12/0815
See application file for complete search history.

(56) References Cited

U.S. PATENT DOCUMENTS 5,951,657 A * 9/1999 Wood ........................ G06F 5/10
711/138
6,959,364 B2 * 10/2005 Safranek ............... G06F 12/082
711/141
(Continued)

FOREIGN PATENT DOCUMENTS

KR   20050056873   6/2005
KR   20070119653   12/2007

OTHER PUBLICATIONS

Patent Office of the Russian Federation, Office Action mailed Jan. 28, 2016 in Russian Patent Application No. 2014139597. (Translation Redacted).

(Continued)

*Primary Examiner* — Aracelis Ruiz
(74) *Attorney, Agent, or Firm* — Trop, Pruner & Hu, P.C.

(57) ABSTRACT

In one embodiment, a conflict detection logic is configured to receive a plurality of memory requests from an arbiter of a coherent fabric of a system on a chip (SoC). The conflict detection logic includes snoop filter logic to downgrade a first snooped memory request for a first address to an unsnooped memory request when an indicator associated with the first address indicates that the coherent fabric has control of the first address. Other embodiments are described and claimed.

23 Claims, 9 Drawing Sheets

(51) Int. Cl.
  *G06F 12/0831* (2016.01)
  *G06F 12/1027* (2016.01)

(56) References Cited

U.S. PATENT DOCUMENTS

| | | |
|---|---|---|
| 2004/0003184 A1 | 1/2004 | Safranek et al. |
| 2004/0117561 A1 | 6/2004 | Quach et al. |
| 2005/0132147 A1 | 6/2005 | Armilli et al. |
| 2006/0224836 A1 | 10/2006 | Blumrich et al. |
| 2006/0224838 A1* | 10/2006 | Blumrich ............ G06F 12/0822 711/146 |
| 2008/0109624 A1 | 5/2008 | Gilbert et al. |
| 2010/0191920 A1 | 7/2010 | Fang et al. |
| 2011/0320672 A1 | 12/2011 | Ganapathy et al. |
| 2012/0233504 A1 | 9/2012 | Patil et al. |
| 2012/0233514 A1 | 9/2012 | Patil et al. |
| 2013/0007386 A1 | 1/2013 | Wolf et al. |
| 2014/0240326 A1 | 8/2014 | Cutter et al. |

OTHER PUBLICATIONS

Korea Intellectual Property Office, Notice of Preliminary Rejection mailed Sep. 22, 2016 in Korean Patent Application No. 2015-7021955.
European Patent Office, Extended European Search Report mailed Nov. 11, 2016, in European Patent Application No. 13878003.6.
International Searching Authority, "Notification of Transmittal of the International Search Report and the Written Opinion of the International Searching Authority," mailed Dec. 24, 2013, in International application No. PCT/US2013/031838.
Patent Office of the Russian Federation, Office Action mailed Jan. 28, 2016 in Russian Patent Application No. 2014139597.
State Intellectual Property Office of the People's Republic of China, Office Action mailed Mar. 15, 2017 in Chinese Patent Application No. 201380073002.7.
Korea Intellectual Property Office, Office Action mailed Mar. 29, 2017, in Korean Patent Application No. 2015-7021955.

* cited by examiner

PROVIDING SNOOP FILTERING ASSOCIATED WITH A DATA BUFFER

TECHNICAL FIELD

This disclosure pertains to computing systems and in particular (but not exclusively) to such systems including a fabric to couple multiple devices to a memory.

DETAILED DESCRIPTION

Figure 1:
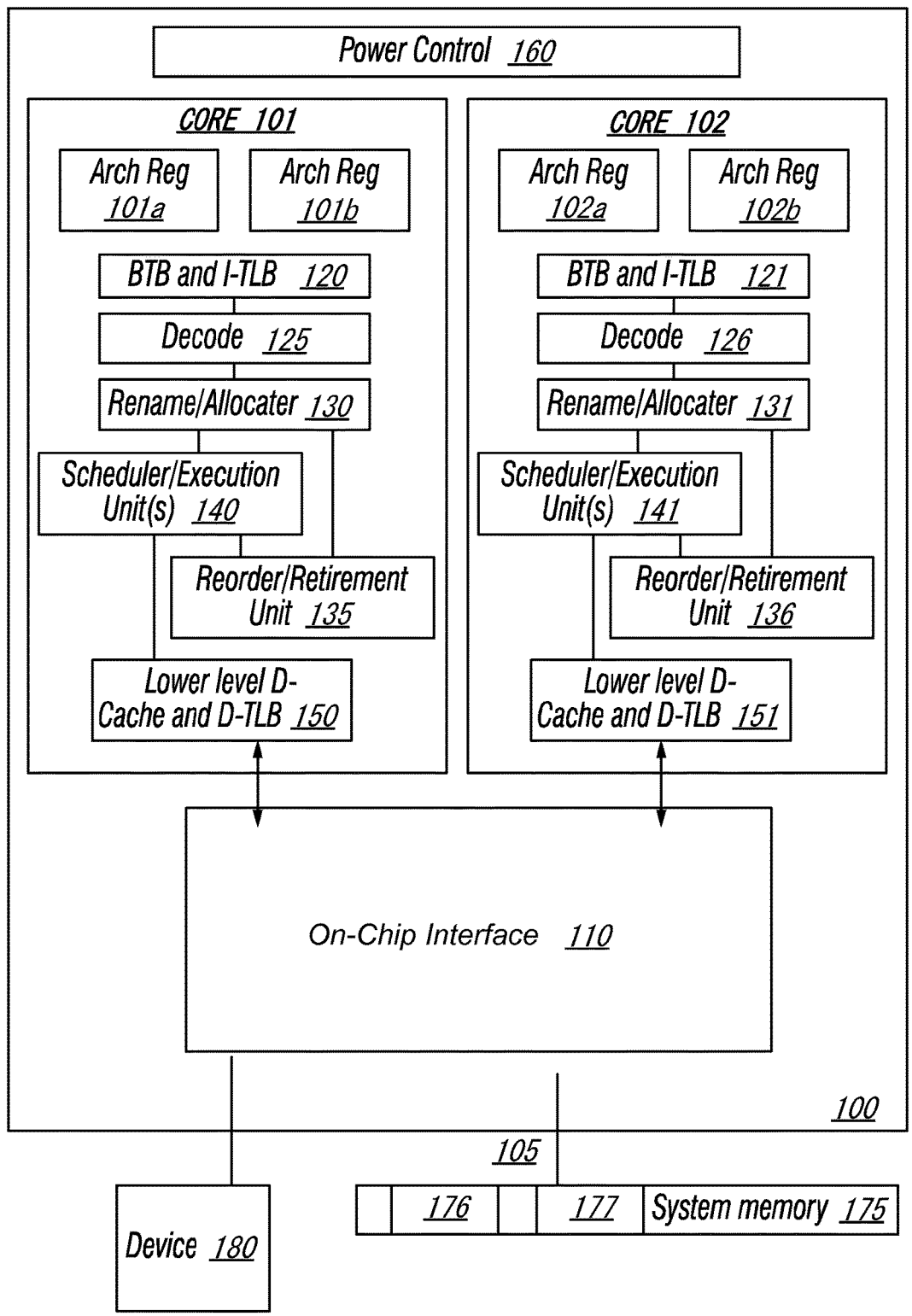
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In various embodiments, a processor may be configured as a system-on-chip (SoC). Such SoC may be used in a wide variety of computing devices from low power portable computing devices such as smartphones, tablet computers, Ultrabooks™ and so forth to more traditional computer systems such as notebooks, desktops, server computers and others. In modern SoCs, typically many different agents are present on a single semiconductor die. These agents include one or more processing units. In an embodiment an SoC may include multiple central processing units (CPUs), each including one or more cores, associated cache memories, interfaces and so forth. In addition, the SoC includes other agents such as a coherency fabric that interconnects agents on-die and performs coherency processing. In some embodiments, this coherency fabric is referred to as a system agent that itself is formed of various constituent components, including memory controller circuitry, shared memory fabric circuitry among other circuitry and logic. The terms "coherent fabric," "coherency fabric" and "system agent" are used interchangeably herein.

A snoop indicator may be associated with a memory request to indicate that the request should be kept coherent with caching agents in the system, such as central processing units (CPUs). Non-caching agents of a SoC can issue snooped and unsnooped memory requests. A coherency fabric or other agent uses a bus protocol to resolve the ownership of a snooped memory request across all caching agents. These coherency protocols can take multiple messaging cycles to resolve ownership of a cache line. One low power/area snooping algorithm operates to process a single coherent request per address at a time. As such, two or more coherent accesses to the same address (e.g., cache line) are serialized, which ensures that ownership is clearly established for each coherent request. This serialization, however, can reduce performance and increase power due to unneeded snoops. Other implementations include an inclusive snoop filter inside the coherency fabric to quickly resolve ownership of all cache lines in the system. Yet, the area/power cost of building such a large snoop filter may be undesirable for low power processors such as SoC's.

Embodiments provide an algorithm and microarchitecture to provide a very low cost temporal snoop filter using data control structures of a coherency fabric. Embodiments may be optimized to filter snoops from non-caching agents that issue many same cache line accesses close in time. In an embodiment, as part of the SoC boot configuration process, the enabling and disabling of the temporal snoop filter is exposed in a BIOS writable control register.

Figure 2:
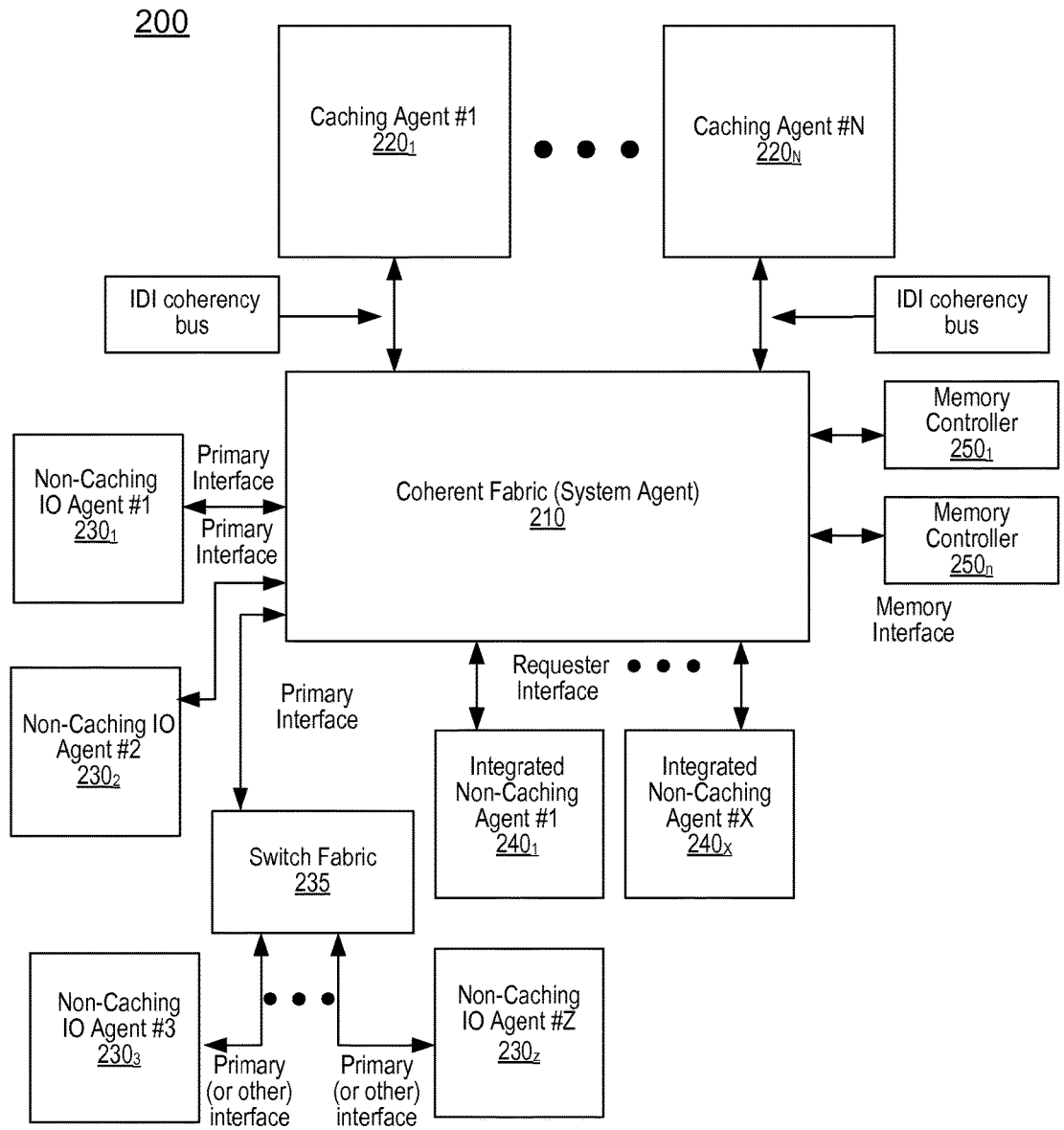
FIG. 2 is a block diagram of a high level view of a system on a chip (SoC) in accordance with an embodiment of the present invention.

Referring now to FIG. 2, shown is a block diagram of a high level view of an SoC in accordance with an embodiment of the present invention. As shown in FIG. 2, SoC 200 includes various agents and other components. For purposes of interconnecting the various agents and providing certain system-level control techniques, a coherent fabric 210 is provided, also referred to herein as a system agent. As will be described further below, system agent 210 includes a temporal snoop filter logic in accordance with an embodiment of the present invention as well as various other components such as queues, buffers, trackers, control logic and so forth.

As seen, coherent fabric 210 acts as a primary on-chip interconnect between a plurality of different agents and other components. On an upstream side, a plurality of caching agents $220_1$-$220_n$ are provided. Although the scope of the present invention is not limited in this regard, these caching agents may correspond to central processing units (CPUs) that generally include one or more processor cores and one or more levels of cache memory. Thus these agents are caching agents in that they are configured to maintain data in a coherent manner via internal agent caches. Although described as CPUs, understand that other types of caching agents such as cores, graphics engines, or other specialized processing logic with associated cache memory may act as caching agents in some embodiments. Also understand that agents that send memory mapped input output (MMIO) writes are not limited to caching agents, and other agents such as non-caching agents also send MMIO transactions.

In contrast, other agents of SoC 200 may be configured as non-caching agents. Different types of non-caching agents may be present such as IO agents which can take many forms such as capture devices, rendering devices, peripheral devices and so forth. Some of these non-caching agents such as non-caching IO agents $230_1$ and $230_2$ are directly coupled to system agent 210 via an on-chip interconnect that complies with ordering rules in accordance with the Peripheral Component Interconnect Express (PCIe™) communication protocol. The non-caching agents issue upstream snooped and non-snooped memory requests on a primary interface of this on-chip interconnect. IO agents can issue memory requests on any virtual channel (VC) that the SoC supports (note that some SoCs support 1 VC, some support 2 VCs, some support 3 VCs and so forth).

Requests and write data arrive to system agent 210 on an inbound path. Read completion data returns to the agent on the outbound path. Caching agents issue downstream requests to IO devices using port IOs or memory mapped reads/writes. These requests travel on a first virtual channel (namely VC0), in an embodiment. Each request from a caching agent 220 receives an indication from system agent 210 when it is globally ordered. MMIO writes from a caching agent 220 are globally ordered when they pass into an ordered domain of system agent 210. This passing is referred to as posting the downstream write into the outbound path. Once an outbound read completion has crossed into the ordered domain, it cannot bypass any prior MMIO write of the same VC that has been posted into the ordered domain.

In turn, other non-caching IO agents $230_3$-$230_z$ couple through a switch fabric 235 to the on-chip interconnect primary interface or a bridge to a different protocol. In the example shown, each of these non-caching agents (and the switch fabric) can couple to coherent fabric 210 via a primary interface of the on-chip interconnect. In an embodiment, a primary interface includes one or more VC's, with no ordering requirements between different VC's. In addition, SoC 200 further includes a plurality of integrated non-caching agents $240_1$-$240_x$ that may directly couple to coherent fabric 210 via a requester interface of a different interconnect technology. Still further, a plurality of memory controllers $250_1$-$250_n$ may be also coupled to coherent fabric 210 to provide interconnection and control functionality for a memory (not shown for ease of illustration in FIG. 2) coupled to the SoC which in an embodiment can be implemented as dynamic random access memory (DRAM).

Coherent fabric 210 includes a shared memory fabric to couple the agents to a shared memory (e.g., via an intervening memory controller). The shared memory fabric is configured to enable compliance with quality of service (QoS) requirements for time critical isochronous devices while also providing memory bandwidth proportioning for non-isochronous devices, also referred to herein as best effort devices, in an embodiment. Although shown with this example in the embodiment of FIG. 2, understand the scope of the present invention is not limited in this regard and many different types of SoCs and other semiconductor devices can take advantage of a temporal snoop filter logic in accordance with an embodiment of the present invention.

A class of service category is assigned to each device coupled to the shared memory fabric. Multiple classes of service may be supported by the fabric. Although the scope of the present invention is not limited in this regard, in one embodiment devices of two classes of service categories may be present, including an isochronous class of service category used for latency sensitive devices and a best effort class of service category used for devices that that can tolerate longer latencies to service their requests to memory. Although the scope of the present invention is not limited in this regard, in some embodiments latency sensitive devices include content rendering devices such as audio or video players, camera devices and so forth, while lower priority devices include processor cores, graphics processing units and so forth.

Time, in the form of a request deadline, is communicated from the isochronous devices to the fabric to indicate to the fabric the required latency to complete a request to memory. To enable synchronization, the fabric broadcasts a global timer to all isochronous requesting agents. This global timer is continuously driven on outputs from the fabric so that is available for sampling by the isochronous devices. Responsive to this time value, the agents determine a latency requirement for completion of a request, and add this latency value to the global timer value to form a deadline for the request. Different manners of determining latency occur in different embodiments. Based on this communicated latency or deadline value, the fabric may make better scheduling decisions based on knowledge of the current power state of the memories and the required latencies for other unscheduled memory requests pending in the fabric. This deadline communication may improve memory bandwidth and also save system power. The use of request deadlines provides the fabric with latency information for each request from an isochronous device.

Embodiments may also provide for efficiency in memory bandwidth by allowing memory requests to be scheduled out of order; however this may result in long scheduling latencies for some requests. To resolve such concern, the fabric assigns a priority level to each isochronous memory request, e.g., a high or low priority. When scheduling high priority isochronous requests the amount of out of order scheduling allowed is less than what is acceptable when scheduling best effort or low priority isochronous requests. Limiting the amount of out-of-order scheduling for high priority requests is done in order to ensure that the request latency requirement is met. Because request priority is determined from the deadline of the request the fabric can determine immediately after a request is scheduled what the priority levels of other pending requests are for an isochronous device. Using the deadline method the priority level of all pending requests only change when the global timer increments.

In an embodiment, the shared memory fabric includes two arbitration points that are used for scheduling requests being sent to the memory controller. The first arbitration point is used to admit requests from the devices into the shared memory fabric and is referred to as an admit arbiter. The second arbitration point is used to schedule the requests sent to the memory controller from the shared memory fabric and is referred to as a scheduler arbiter.

Each device connected to the shared memory fabric has a request interface that is connected between the device and fabric. The request interface supplies information about the request that can be used for QoS memory scheduling. In an embodiment, this information includes a memory address, order ID field and an opcode field. For isochronous devices an additional field called a request deadline field is provided to indicate the required latency needed to complete the request. Note that in some implementations of SoCs the memory fabric interface may be connected to other fabrics or switches which allows multiple devices to share a common request interface.

Figure 3:
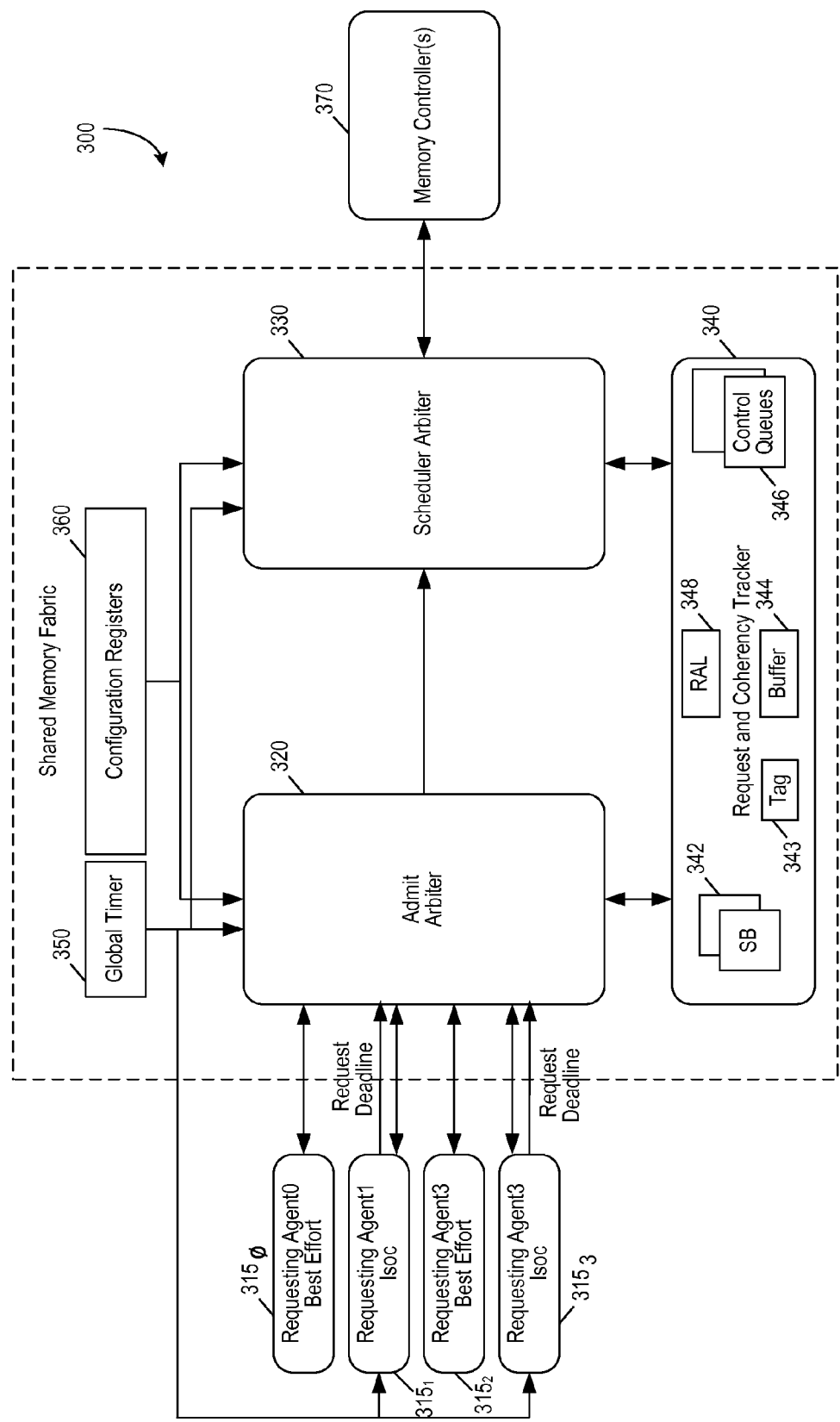
FIG. 3 is a block diagram of a portion of a shared memory fabric in accordance with an embodiment of the present invention.

Referring now to FIG. 3, shown is a block diagram of a portion of a shared memory fabric in accordance with an embodiment of the present invention. As shown in FIG. 3, a shared memory fabric 300 is coupled between a plurality of agents $315_0$-$315_3$ (generically agent 315) and a memory controller 370. Note that in some embodiments more than one memory controller is present. Of course while not shown for ease of illustration understand that the memory controller is coupled to a system memory such as a dynamic random access memory (DRAM) or other system memory.

In the embodiment shown in FIG. 3, different types of agents are coupled to shared memory fabric 300. Specifically, the different agents include a first class of service (COS) agent type, namely so-called isochronous agents and a second class of service agent type, namely so-called best effort COS agents. As seen, each of the agents 315 may communicate request information to an admit arbiter 320. In turn, admit arbiter 220 can communicate corresponding control type information back to the agents. In addition, the isochronous agents (namely agents $315_1$ and $315_3$ in the embodiment of FIG. 3) further include an additional link to communicate request deadline information to admit arbiter 320. To this end, these agents are further configured to receive global timing information from a global timer 350, also coupled to both admit arbiter 320 and a scheduler arbiter 330.

In the embodiment of FIG. 3, admit arbiter 320 may be configured to receive incoming requests from agents 315 (and request deadline information from isochronous agents) and to select appropriate requests to admit to scheduler arbiter 330. To aid in its arbitration process, admit arbiter 320 receives configuration information from a set of configuration registers 360, further coupled to scheduler arbiter 330. In addition, a request and coherency tracker 340 may be coupled to arbiters 320 and 330. In general, tracker 340 may include multiple scoreboards 342, a data buffer 344 and corresponding address tag storage 345, control queues 346 and other resources such as various buffers, logic such as resource allocation logic 248, and so forth. In some implementations, the tag array and data buffer may be located elsewhere than the tracker. Although shown at this high level in the embodiment of FIG. 3, understand the scope of the present invention is not limited in this regard.

The shared memory fabric may include certain finite resources that are first allocated before a request from a requesting agent can be granted by the admit arbiter. These resources include available entries in the internal data buffer and address tag storage. Other finite resources include available entries in the memory scheduler and request tracker scoreboards. There is a one-to-one correspondence in resources for the fabric's internal data buffer, tag array and memory scheduler scoreboard. In an embodiment, these resources are allocated to a predetermined region (e.g., a cache line width such as 64 bytes) of memory. Each active request is also allocated its own entry in the request and coherency tracker, but multiple requests to the same region in memory share the same entry in the data buffer, tag array and memory scheduler scoreboard. Although it is possible for more than 1 request to be allocated to the same data buffer, tag array, and scheduler scoreboard entry, only 1 read request is scheduled to the memory controller for all outstanding read requests in the request and coherency tracker.

The request interface for all devices connects to the admit arbiter of the fabric. Isochronous devices use the deadline field of the request bus to indicate to the fabric the required latency to complete the request. The fabric sends a global timer value to all isochronous devices that are attached to the fabric. For each request to be sent to the fabric, the isochronous device, e.g., in a deadline logic, determines the required latency needed for the request to complete and adds the value to the current value of the global timer in order to create the request deadline. Different methods may be used by different isochronous devices to determine the required latency for the request, but all isochronous devices indicate to the fabric the request latency using a deadline field of the request interface.

In an embodiment, the admit arbiter has two levels of priority. There is a high priority path in the arbiter that is used for urgent isochronous requests. A request is considered urgent if the requesting agent is configured as an isochronous agent and the deadline field of the request is less than a value stored in a configuration register specifying a threshold value, referred to an urgency threshold value. The admit arbiter also has a low priority path used for best effort requests and for isochronous requests that are not considered urgent. The final level of arbitration is done using a priority selector that selects between the winner of the high priority arbitration and the winner of the low priority arbitration.

In one embodiment, the admit arbiter final selector has two modes that can be selected using a configuration register. The first mode is a fixed priority mode in which, assuming at least one high priority request is present at the input of the admit arbiter, the selector chooses the winner of the high priority arbitration path before choosing the winner of the low priority arbitration path. The second mode of the final selector is a weighted round robin mode in which the final selector switches between granting the high priority path to granting the low priority path after N number of high priority requests are granted. The selector then grants M number of low priority requests from the winner of the low priority path before switching back to granting requests from the high priority path. In an embodiment, the values for N and M are specified using configuration registers.

Figure 4:
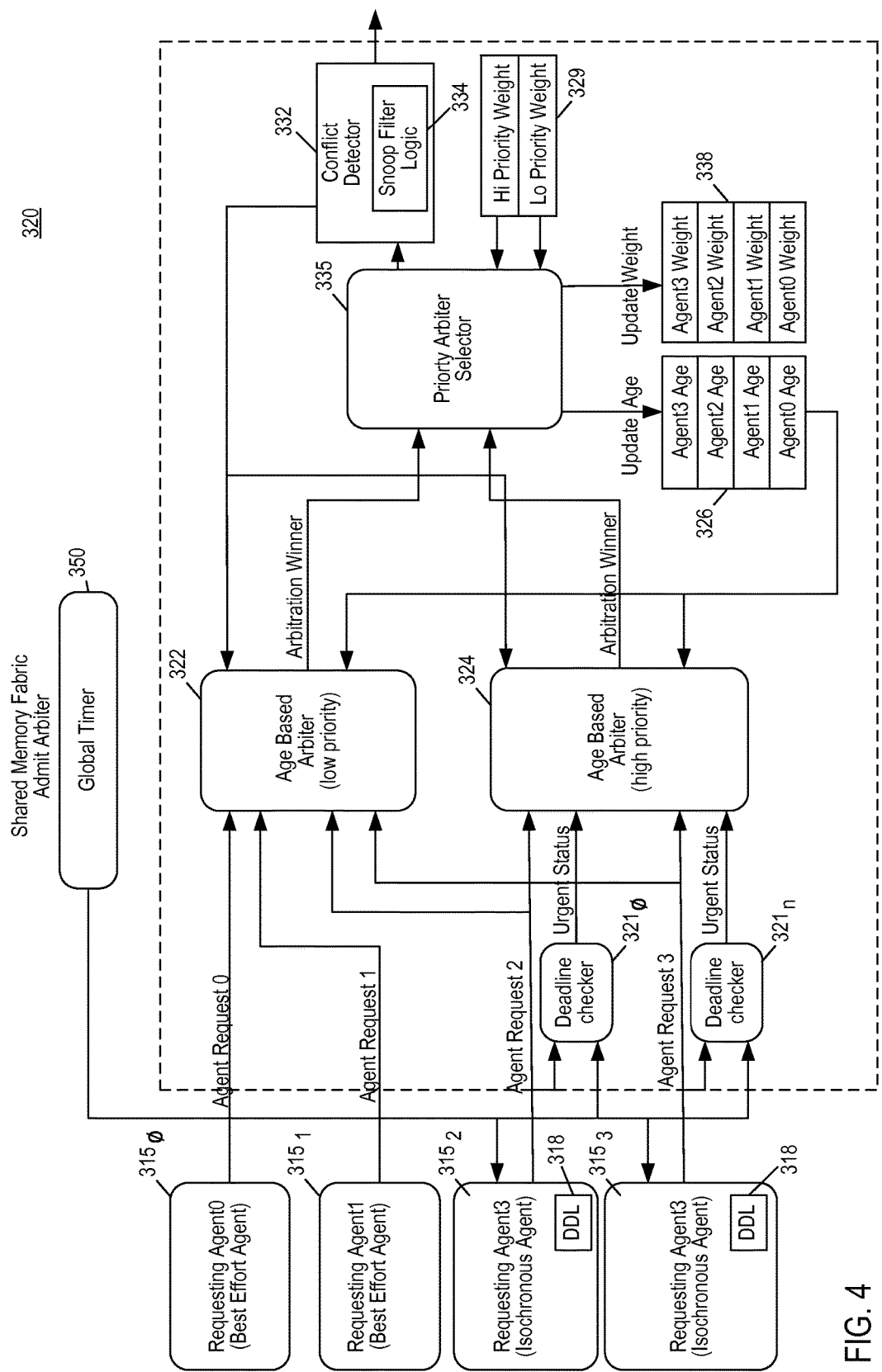
FIG. 4 is a block diagram of further details of an admit arbiter in accordance with an embodiment of the present invention.

Referring now to FIG. 4, shown is a block diagram of further details of an admit arbiter in accordance with an embodiment of the present invention. As shown in FIG. 4, arbiter 320 receives incoming requests from the requesting agents. In this illustration, requesting agents $315_0$ and $315_1$ are non-isochronous or best effort agents, while agents $315_2$ and $315_3$ are isochronous agents. Note that the isochronous agents may include or be coupled to deadline determination logic 318 that is used to calculate required latency for requests. In an embodiment in which at least some of the agents are third party IP blocks, this logic can be implemented in wrapper or interface logic that couples the agent to the shared memory fabric.

In the embodiment shown, admit arbiter 320 includes a first age-based arbiter 322 and a second age-based arbiter 324, which correspond to low and high priority age-based arbiters, respectively. Thus as seen, requests from all of agents 315 are provided to first arbiter 322, while only requests from isochronous agents $315_2$ and $315_3$ are provided to second arbiter 324. To determine whether a particular request from one of the isochronous agents is of an urgent status, a pair of deadline checker logics $321_0$ and $321_n$ are each coupled to receive requests from a corresponding one of these isochronous agents, as well as global timing information from global timer 350. Based on a comparison of the deadline information provided by the agent and the global timing information, an indication of an urgent status for a corresponding request can be provided to second arbiter 324.

In operation, arbiters 322 and 324 operate to select an arbitration winner from a set of incoming requests. In the embodiment shown, this determination is based in part on information from an age storage 326 that stores an age value for each of the agents. The corresponding winners from each of the arbiters may be coupled to a priority arbiter selector 325 that selects based on mode of operation a corresponding request to provide to scheduler arbiter 330 (not shown for ease of illustration in FIG. 4). To this end, selector 325 may select a request for admission to the scheduler arbiter based at least in part on information in a priority storage 329.

The age-based algorithm implemented by the admit arbiter is such that the requesting agent which has waited the longest since last being granted by the arbiter will be given the highest priority level. Once an agent has received the highest priority level, the priority level for that agent will not change unless that agent has been granted by the arbiter. In this way, starvation issues commonly found using round robin arbitration may be avoided by ensuring that the priority level for a requesting agent can only increase in priority level until that requesting agent has been granted by the arbiter.

The admit arbiter also allows for agent weights to be assigned to all requesting agents. Weights are used to allocate a percentage of the request bandwidth for each requesting agent. In an embodiment, a weight value is specified for each agent via a value stored in an agent weight configuration register. The percentage of request bandwidth that is allocated to an agent is equal to the agent weight value divided by the sum of weights for all agents, in an embodiment.

The admit arbiter weighted age-based algorithm is based on the relative age of when a requesting agent was last granted by the arbiter. For each requesting agent that connects to the admit arbiter, there is one age counter instantiated and one weight counter instantiated. Both the high priority and low priority arbitration paths in the admit arbiter share common age and weight counters for the agents connected to the admit arbiter. The updating of the requesting agent's age and weight registers is determined by the final selector (namely the priority arbiter selector 325) after choosing the final arbitration winner.

The age registers (e.g., of age storage 326) for all requesting agents are first initialized responsive to receiving a reset input to the admit arbiter. When reset asserts, the age registers are initialized to unique values in a range starting at 0 and ending at a value of N−1, where the value of N equals the number of request interfaces connected to the admit arbiter.

Prior to any requests being asserted by the requesting agents, the agent weight counters (e.g., of weight storage 328) are initialized from programmed values in the agent weight configuration registers of the fabric. Once the weight counters are initialized the counter for an agent decrements by one for each request granted for that agent. Once an agent's weight counter reaches zero and if the agent is granted again by the admit arbiter, the counter is reloaded with the value programmed in the configuration register for that agent's weight.

In one embodiment, the age-based arbitration method performed in first and second arbiters 322 and 324 uses a request bit vector (each arbiter having its own vector) to determine the winner of the arbitration. When a request is asserted for an agent the arbiter uses the age value for the requesting agent as the priority level of the request. The priority levels for the arbiter and thus the range of the bit vector width is from 0 to N−1. The age-based algorithm guarantees that the age values for all requesting agents are always unique and therefore there is always only one winner per arbitration.

The arbiter updates the age registers for all agents when the weight counter for the winner of the request arbitration has reached zero. In one embodiment, the age registers for all agents are updated according to the following rules that guarantee the age values for the agents are always a unique value.

Rule 1: when the agent's age equals the age of the winner of the arbitration, the age register for that agent is set to zero to indicate youngest request age or lowest priority.

Rule 2: when the agent's age is less than the winner of the arbitration, the agent's age register is incremented by 1.

Rule 3: when the agent's age is greater than the winner of the arbitration, the agent's age register does not change.

As further shown in FIG. 4, after a given request is selected in priority arbiter selector 325, it is provided to a conflict detector 332, which performs conflict detection on various incoming requests to prevent various sources of conflicts such as conflicts in allocating a buffer and address conflicts in which the data being requested is currently being accessed by another requestor. Still further, conflict detector 332 may also handle snoop conflict cases in which a cache line, e.g., within data buffer 344, is in the process of having a snoop request being performed to one or more cache memories of the SoC. To more readily handle such snoop conflict cases, conflict detector 332 may further include a snoop filter logic 334 as described herein. In general, snoop filter logic 334 may, with minimal complexity and low power, prevent at least some of these snoop conflict cases by converting or downgrading incoming snooped memory requests from non-caching agents to unsnooped memory requests that can be handled without delay, and thus without snoop conflict resolution. Although shown at this high level in the embodiment of FIG. 4, understand the scope of the present invention is not limited in this regard.

Note that when a conflict is detected in conflict detector 332, feedback information is communicated to arbiters 322 and 324. In this way, these arbiters may mask the corresponding requesting agent from further arbitration rounds until the conflict is resolved. As such, this feedback signal acts as a mask, reducing the number of requesting agents available for performing arbitration in one or more arbitration rounds. Note that when a given conflict has been resolved, this mask signal is removed, enabling the requesting agent to participate in arbitration rounds. Note that in some embodiments, such requests stalled due to a conflict may then be re-introduced into arbiters 322 and 324 with a higher priority.

Figure 5:
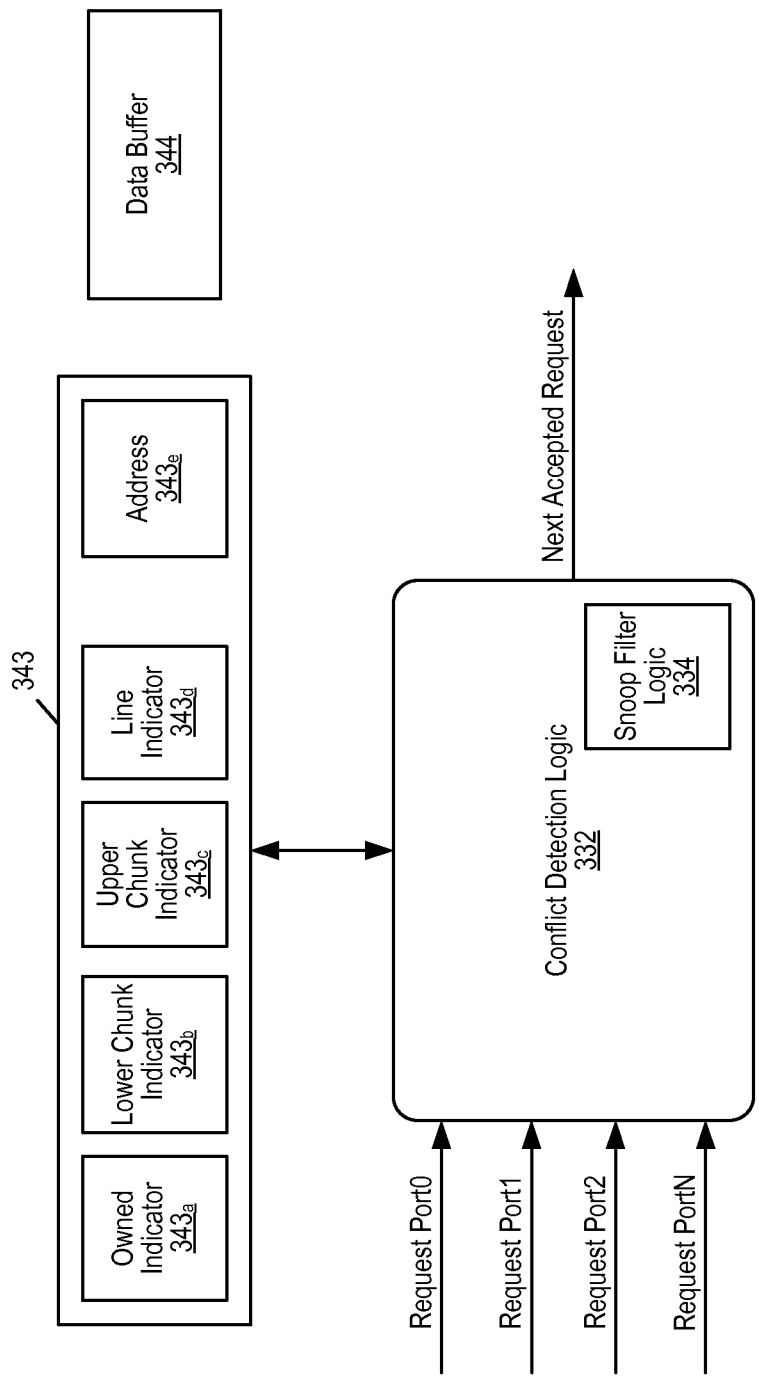
FIG. 5 is a block diagram showing further details of a shared memory fabric in accordance with an embodiment of the present invention.

Referring now to FIG. 5, shown is a block diagram showing further details of a shared memory fabric in accordance with an embodiment of the present invention. As shown in FIG. 5, conflict detection logic 332 is configured to receive an arbitrated request from one of a plurality of request ports (e.g., each corresponding to a requesting agent of an SoC). More specifically, an incoming request may be received from the output of priority arbiter selector 325 of FIG. 4. That is, when priority arbiter selector 325 provides a request that has been finally selected for output, it is provided on a corresponding line associated with the given requesting agent.

As seen in FIG. 5, conflict detection logic 332 includes snoop filter logic 334, which may reduce the number of snoop conflict cases by converting at least some incoming snooped memory requests from non-caching agents to unsnooped requests, enabling their acceptance to be output as a next accepted request, rather than stalling the request and in turn potentially stalling forward progress of the requesting agent itself. Note that if conflict detection logic 332 cannot accept a request due to a conflict in allocating a buffer, then that requestor may be blocked until the conflict is resolved and a data buffer can be allocated. Another conflict case is that the line is currently still being snooped to a caching agent. Without an embodiment of the present invention, a coherency protocol would require that ownership of a cache line be fully resolved before snooping the same cache line again. Using an embodiment of the present invention, at least some snooped requests can be converted into unsnooped requests and allowed to enter into the coherent fabric (further portions of the system agent) earlier in time. Embodiments may perform snoop filtering using low power and minimal SoC structures. Still further embodiments may improve performance of multiple snooped memory requests to the same cache line, as may be common from non-caching agents.

To perform conflict detection operations and snoop memory request downgrades/conversions in accordance with an embodiment of the present invention, conflict detection logic 332 is coupled to receive certain information associated with data buffer 344. More specifically, conflict detection logic 334 is configured to receive status and control information from a tag storage 343. In different implementations, tag storage 343 may be part of the data buffer or it may be a separate storage array associated with the data buffer (e.g., having the same number of lines or entries as data buffer 344). In an embodiment, data buffer 344 and tag storage 343 each may include 64 entries. In one such embodiment, data buffer 344 provides for storage of 64B widths.

Still referring to FIG. 5, tag storage 343 is illustrated to include a number of constituent components. Tag storage 343 includes an owned indicator $343_a$. In an embodiment, this indicator may be a single bit to indicate that the corresponding entry or line within data buffer 344 is owned by the system agent. Although described as being "owned" note that what is meant here is that the system agent has previously invalidated this corresponding cache line in any cache of the SoC and thus this owned indictor of a first state (e.g., logic high) denotes that a valid copy of data of this cache line is not present in any cache memory of the SoC such that there is no need to perform a snooped request (although note the data may be present in the corresponding entry of data buffer 344). Stated another way, the memory controller of the fabric has snooped the line and no caching agent has requested the line since that snoop was performed. Hence the memory controller is guaranteed to have the only copy of the line in the system.

Further control and status indicators within tag storage 343 include a lower chunk status indicator $343_b$ and an upper chuck status indicator $343_c$, each of which may include indications as to whether the given chunk is currently being accessed (read or write status) and a reference count which may allow multiple accesses to the same chuck of the cache line). Using such status indicators, new independent read and write accesses (from the same requestor) may be allowed to the different chunks of a single cache line. In turn, a line status indicator $343_d$ may be of a first state to indicate that the line includes modified data that is to be flushed to memory. Finally, address field $343_e$ stores an address, e.g., within a physical address (or address portion) of the system memory associated with the corresponding data buffer entry. Although shown at this high level in the embodiment of FIG. 5, understand additional and/or different information may be present in other embodiments.

Note that the snoop filter logic is temporal. That is, instead of providing for a full directory or a snoop filter that is inclusive with cache memories of the SoC, instead a very limited snoop filter logic is provided. In particular embodiments, snoop filtering can be performed only for memory requests that hit within the data buffer of the shared memory fabric. Thus in an implementation in which this data buffer includes 64 entries, the snoop filter logic may provide corresponding snoop filter capabilities only for these 64 entries. Thus the snoop filtering enabled using an embodiment of the present invention is temporal in that snoop filtering is done only for these entries when present. When data of an entry is evicted, the ability to perform snoop filtering for memory requests associated with that data is lost.

And, using snoop filter logic 334, multiple requests to the same address may be accepted and provided for handling within the shared memory fabric without the need to stall or hold the subsequent memory requests when the ownership indicator indicates that the corresponding data is owned by the system agent.

Note that by converting a snooped memory request to an unsnooped memory request, that memory request is thereafter handled as an unsnooped memory request. Stated another way, at no time during handling of this memory request is any type of snoop processing performed.

Figure 6:
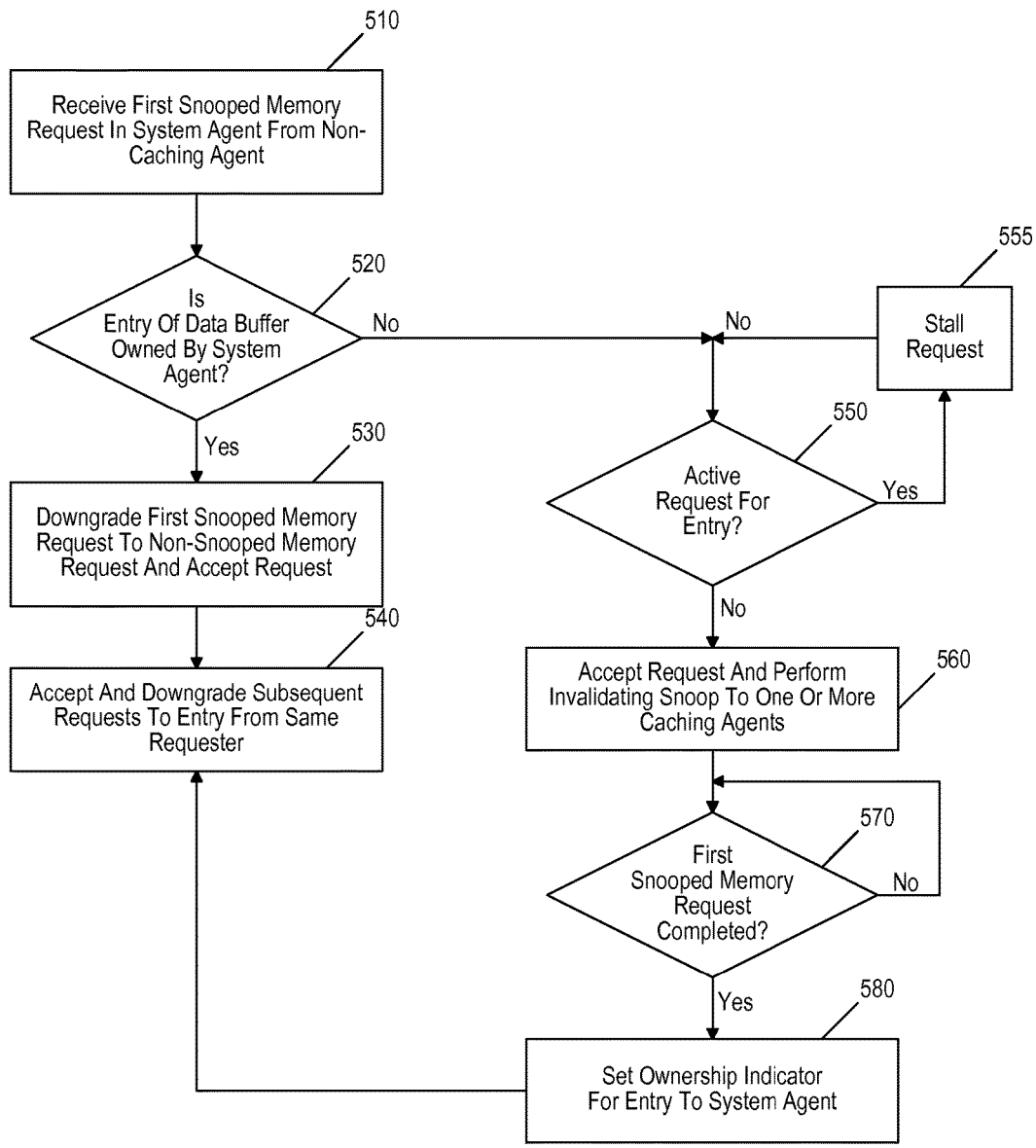
FIG. 6 is a flow diagram of a method in accordance with an embodiment of the present invention.

Referring now to FIG. 6, shown is a flow diagram of a method in accordance with an embodiment of the present invention. As shown in FIG. 6, method 500 may be implemented at least in part by snoop filter logic of a fabric. In various implementations, combinations of hardware, firmware and/or software may be used to perform operations to more efficiently handle incoming memory requests from non-caching agents coupled to the fabric. In the embodiment of FIG. 6, a simplified handling is performed such that certain snooped memory requests are downgraded when a prior snooped memory request to the same address has been completed and a system agent is owner of the address. While this eases implementation, in other embodiments as described below, even greater latency reductions can be realized by allowing consecutive requests to be accepted even before the system agent becomes owner.

Method 500 begins by receiving a first snooped memory request in a system agent from a non-caching agent (block 510). This system agent may constitute a fabric that includes the snoop filter logic. Control next passes to diamond 520 where it is determined whether an entry of a data buffer that is associated with an address of this snooped memory request is owned by the system agent. In an embodiment, this determination can be based on an ownership indicator of the corresponding entry of the data buffer. When of a set or logic high state, this indicator indicates that the entry is owned by the system agent. Stated another way, this set ownership indicator indicates that no caching agent includes a valid copy of the data for the associated entry (and address of the request).

If the entry is owned by the system agent, control passes to block 530, where the snooped memory request can be downgraded to a non-snooped memory request. In an embodiment, the logic converts this received snooped memory request to a non-snooped memory request. Furthermore, because it is established that no valid copy of the data for the corresponding entry is present in any cache of the SoC, the request may be accepted without causing the request to stall. Of course understand that in various embodiments at this point, the request may be arbitrated among other such requests and may not be accepted until one or more arbitration rounds have passed. And, any subsequent memory requests from the same requester to this same entry may also be accepted without delay (block 540).

After accepting the request, it is handled by various logic of the system agent such as a shared memory fabric. For example, for an unsnooped read request, if the data is present in the data buffer of the fabric, the requested data may be returned to the requestor. And if not present there, a memory request may be issued via a memory controller to the memory including the data. Instead for a write request, the data associated with the write request may be written into the corresponding entry of the data buffer. Then at a later time, e.g., responsive to an eviction from the data buffer, this data may be written back to memory.

Note that in an embodiment, for a snooped read request where ownership is indicated to be with the system agent, additional handling can be performed. More specifically, when prior snoop invalidations from the same requesting port as this snooped memory request are pending, results of the snooped read request (which is downgraded to an unsnooped request), may be held pending completion of the prior snoop operations from the same requesting port. That is, the data read from memory and stored in a data buffer of the system agent may be held there until results of prior snoop invalidations (e.g., writes) have completed. When all prior snoop transactions from the requesting agent have completed, the data obtained for this downgraded snooped read request is returned to the requester.

Still referring to FIG. 6, if instead at diamond 520 it is determined that the entry of the data buffer is not owned by the system agent, control passes to diamond 550, where it is determined whether an active request is pending for the entry. If so, control passes to block 555, where the request is stalled until the active request has completed and is no longer pending.

Otherwise if no request is pending for the entry, control passes to block 560 where the request is accepted. As part of handling this request, a typical snoop flow may be performed such that an invalidating snoop request is sent to one or more caching agents, e.g., one or more cores of the SoC having an associated cache memory. By way of these invalidating snoop requests, a most recent copy of the data may be obtained. In addition, the copies of the data present in these one or more cache memories may be invalidated.

Control next passes to diamond 570 where it can be determined whether the snooped memory request has completed. In an embodiment, the determination at diamond 570 is based on whether the memory request has retired. If so, control passes to block 580. There, the ownership indicator for the entry may be set to indicate ownership with the system agent. In other words, this ownership indicator may be updated to a set or logic high state. By way of this update, the system agent is indicated to be the owner as all copies of the data in any caches of the SoC have been invalidated. As such, when incoming snooped memory requests from non-caching agents are received for the corresponding entry, they may be converted to unsnooped memory requests and be handled according to an unsnooped request flow, as it is guaranteed that no valid copies of the data are present in any cache of the SoC. Thus as seen in FIG. 6, control passes from block 580 to block 540 described above.

Furthermore, to improve processing, should multiple incoming memory requests for this same address be received from the same requestor, the requests all can be accepted and handled without stalling, improving performance. Although shown at this high level in the embodiment of FIG. 6, understand the scope of the present invention is not limited in this regard. That is, in various embodiments further ordering rules and other requirements may be involved in handling incoming memory requests using snoop filter logic in accordance with an embodiment of the present invention. In addition, for certain types of requests even further reduced latency can be realized by downgrading and accepting snooped memory requests even prior to ownership of a corresponding cache line by a system agent.

Figure 7:
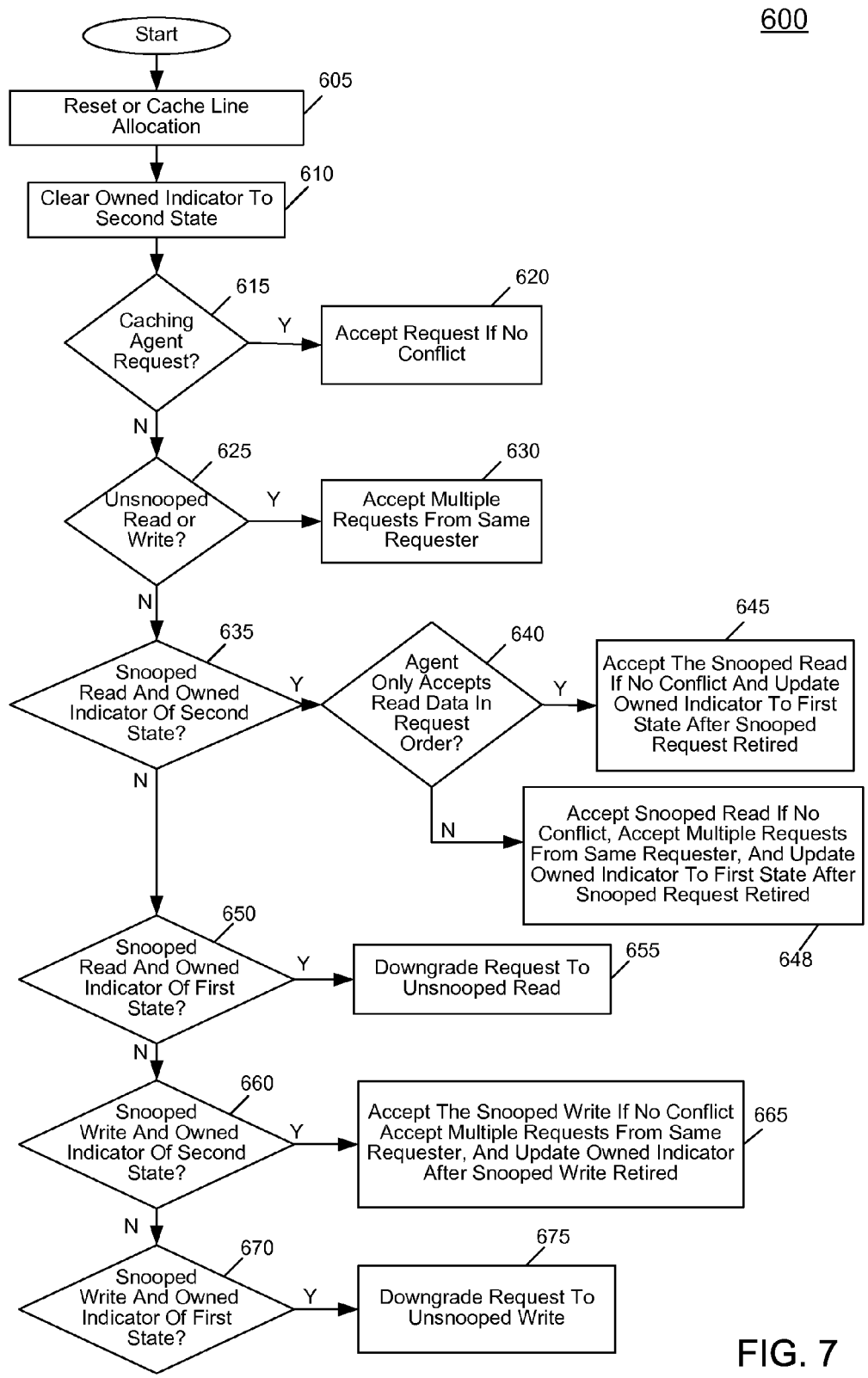
FIG. 7 is a flow diagram of a method for handling incoming memory requests using snoop filter logic in accordance with an embodiment of the present invention.

Referring now to FIG. 7, shown is a flow diagram of a method for handling incoming memory requests using snoop filter logic in accordance with an embodiment of the present invention. As shown in FIG. 7, method 600 may be performed by various hardware, software and/or firmware of an SoC. In an embodiment, at least portions of the method may be implemented within conflict detection logic 332 and snoop filter logic 334 of FIG. 5. Method 600 begins on reset or when a new address is allocated to a cache line within the SoC data buffer (block 605). Responsive to such initiation of the method, the owned indicator associated with that cache line may be cleared (block 610). By way of clearing the owned indicator, no guarantee is placed on whether data of that line is owned or otherwise associated with a caching agent of the SoC (e.g., whether the data is present in a cache line or a caching agent of the SoC).

Still referring to FIG. 7, next it can be determined whether an incoming memory request is from a caching agent (diamond 615). If so, control passes to block 620 where the request may be accepted if no conflict is present. More specifically, in an embodiment a request to a cache line is accepted only when there are no active requests to the line. When the request is accepted, the owned indicator for the line is placed into a second state, e.g., cleared. After accepting this request, no other request to the cache line is allowed to be accepted into the system agent until this request has been retired. Note that write requests do not need to be flushed to DRAM, and instead may be marked with a dirty status in the buffer.

Next at diamond 625 it can be determined whether the incoming request is an unsnooped read or write request. If so, control passes to block 630 where multiple requests from the same requestor may be accepted. More specifically, in one embodiment multiple requests are allowed to be accepted into the system agent to the same line as long as they are received from the same requester and there are no read/write conflicts for a 32B chunk. For these unsnooped requests, the owned indicator may be maintained in its current state.

Still referring to FIG. 7, next at diamond 635 it can be determined whether the incoming request is a snooped read request and the owned indicator is of a second, cleared state. If so, control passes to diamond 640 where it can be determined whether the agent initiating the request only accepts data in request order. If so, control passes to block 645 where the snooped read may be accepted if there are no conflicts. Furthermore, at the successful retirement of this snooped read request, the owned indicator may be updated to the first state.

If instead at diamond 640 it is determined that the agent need not accept read data in request order, control passes to block 648. There, the snooped read may be accepted if there are no conflicts. Furthermore, at the successful retirement of this snooped read request, the owned indicator may be updated. More specifically, in an embodiment the snooped read request is accepted only when there are no active requests to the line. The owned indicator may be maintained in the second state until the first snooped read is retired. While the owned indicator is in the second state and the first snooped read is still active, reads and unsnooped read requests to the same line may be accepted only from the same requester port. After accepting the first snooped read request, all successive snooped reads are downgraded to unsnooped read requests. Note that these requests may be accepted and downgraded prior to completion of snoop processing for the first snooped read request. When the first snooped read request is retired, the owned indicator is set to the first state.

Still with reference to FIG. 7, if the incoming memory request is not a snooped read request with an owned indicator of the second state, control passes to diamond 650 to determine whether the incoming request is a snooped read request with an owned indicator of the first state. If so, control passes to block 655 where the request may be downgraded to an unsnooped read request and appropriately handled. In an embodiment, note that multiple requests are allowed to be accepted to the same line as long as they are received from the same requester and there are no read/write conflicts for a 32B chunk. Also note that the owned indicated is maintained in the first state.

Otherwise, control passes from diamond 650 to diamond 660 to determine whether an incoming request is a snooped write request and the owned indicator is of the second state. If so, control passes to block 665 where the snooped write request may be accepted if there are no conflicts. Furthermore, when this snooped write request is retired, the owned indicator may be updated. More specifically, in an embodiment the snooped write request is accepted only when there are no active requests to the cache line. The owned indicator for the cache line is maintained in the second state until the first snooped write request is retired. While the owned indicator is of the second state and the first snooped write request is still active, multiple snooped write requests and unsnooped write requests to the same cache line are allowed to be accepted only from the same requester. When the first snooped write request is retired, the owned indicator is set to the first state.

Still with reference to FIG. 7, control otherwise passes from diamond 660 to diamond 670 to determine whether the incoming request is a snooped write and the owned indicator is of the first state. If so, control passes to block 675 where the request may be downgraded to an unsnooped write request. In an embodiment multiple requests are allowed to be accepted to the same cache line as long as they come from the same requester and there are no read/write conflicts for a 32B chunk. The owned indicator may be maintained in the first state. Although shown at this high level in the embodiment of FIG. 7, understand the scope of the present invention is not limited in this regard.

Figure 8:
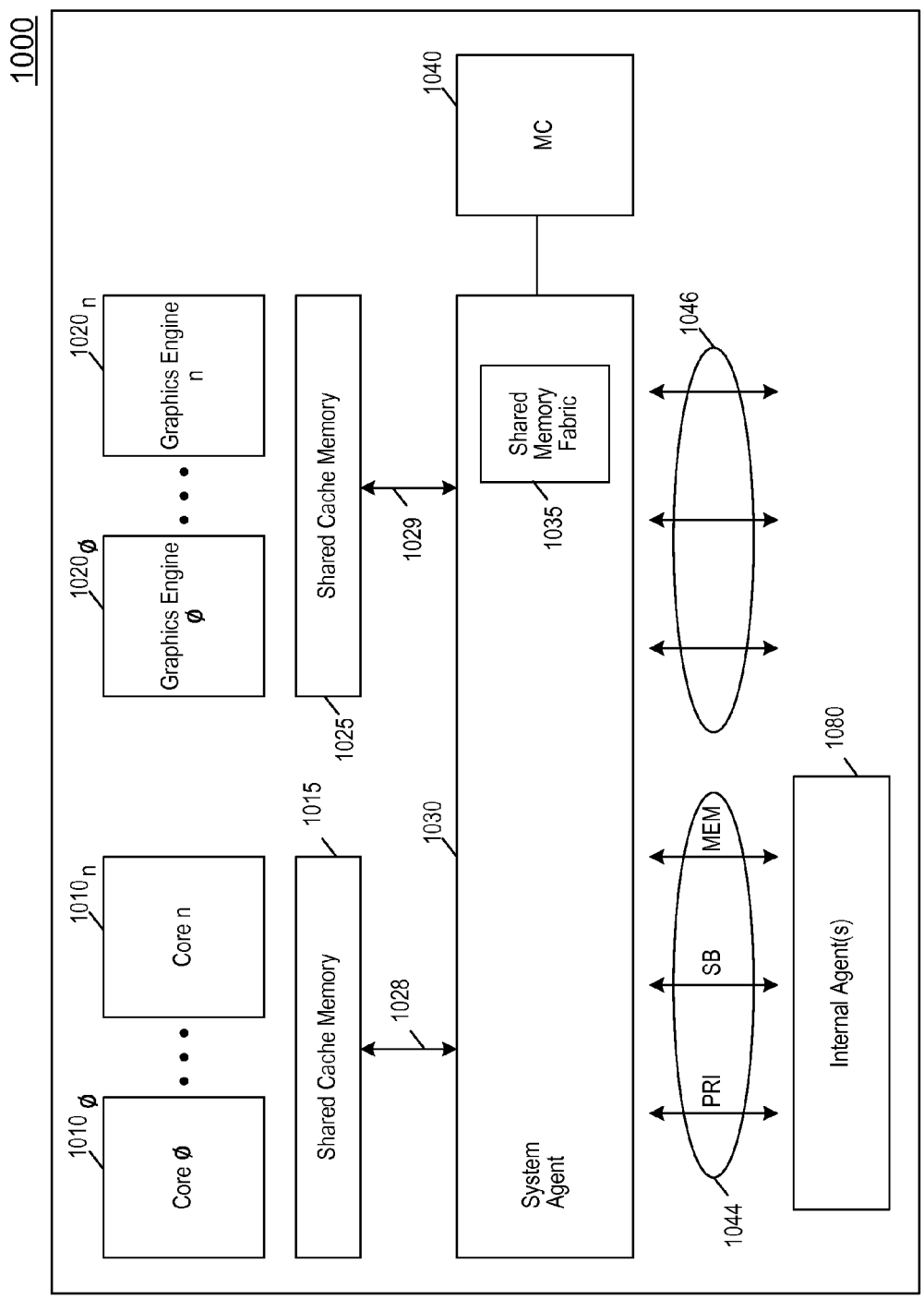
FIG. 8 is a block diagram of an SoC in accordance with an embodiment of the present invention.

Referring now to FIG. 8, shown is a block diagram of an SoC in accordance with an embodiment of the present invention. As shown in FIG. 8, SoC 1000 is a single die semiconductor device including multiple IP blocks along with a shared memory arbiter as described above. In the embodiment of FIG. 8 a plurality of cores $1010_0$-$1010_n$ are provided, each of which can independently execute instructions. In one embodiment, all of these cores are of a single design such as an in-order core design, e.g., of an Intel Architecture™ such as an Atom™-based core. In other embodiments, the cores may be out-of-order processors such as an Intel Architecture™ (IA) 32 core such as an Intel Core™-based design. In other embodiments, a mix of heterogeneous cores may be provided. In addition, a plurality of graphics engines, namely independent graphics units $1020_0$-$1020_n$ may be provided each to independently perform graphics operations. As seen, the multiple cores are coupled to a shared cache memory 1015 such as a level 2 (L2) cache and similarly, the graphics engines are coupled to another shared cache memory 1025.

A system agent 1030 is coupled to these cores and graphics engines via corresponding in-die interconnects 1028 and 1029. As seen, system agent 1030 includes a shared memory fabric 1035 which may be configured as described herein. Of course various other logic, controllers and other units such as a power management unit may be present within system agent 1030. As seen, shared memory fabric 1035 communicates with a memory controller 1040 that in turn couples to an off-chip memory such as a system memory configured as DRAM. In addition, system agent 1030 is coupled via a set of interconnects 1044 to one or more internal agents 1050 such as various peripheral devices. In an embodiment, interconnect 1044 may include a priority channel interconnect, a sideband channel interconnect, and a memory channel interconnect. A similarly configured interconnect 1046 provides for communication between system agent 1030 and one or more off-chip agents (not shown for ease of illustration in the embodiment of FIG. 8). Although shown at this high level in FIG. 8, understand the scope of the present invention is not limited in this regard.

Figure 9:
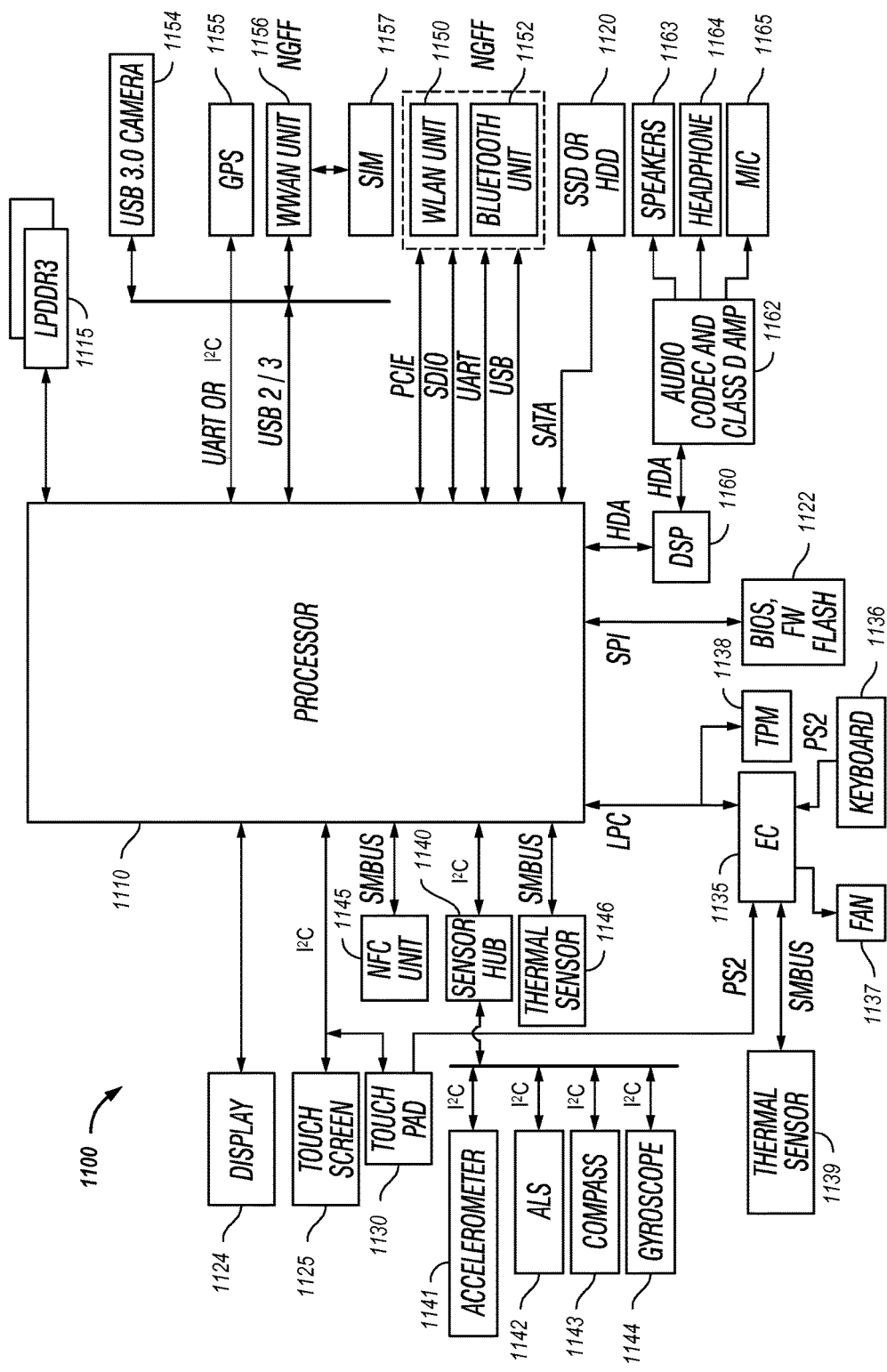
FIG. 9 is a block diagram of components present in a computer system in accordance with an embodiment of the present invention.

Referring now to FIG. 9, shown is a block diagram of components present in a computer system in accordance with an embodiment of the present invention. As shown in FIG. 9, system 1100 can include many different components. In one embodiment, system 1100 is a user equipment, touch-enabled device that incorporates an SoC as described herein. Note that the components of system 1100 can be implemented as ICs, portions thereof, discrete electronic devices, or other modules adapted to a circuit board such as a motherboard or add-in card of the computer system, or as components otherwise incorporated within a chassis of the computer system. Note also that the block diagram of FIG. 9 is intended to show a high level view of many components of the computer system. However, it is to be understood that additional components may be present in certain implementations and furthermore, different arrangement of the components shown may occur in other implementations.

As seen in FIG. 9, a processor 1110, which may be a low power multicore processor socket such as an ultra low voltage processor, may act as a main processing unit and central hub for communication with the various components of the system. Such processor can be implemented as a SoC as described herein. In one embodiment, processor 1110 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 1110 may communicate with a system memory 1115, which in an embodiment can be implemented via multiple memory devices to provide for a given amount of system memory. To provide for persistent storage of information such as data, applications, one or more operating systems and so forth, a mass storage 1120 may also couple to processor 1110. Also shown in FIG. 9, a flash device 1122 may be coupled to processor 1110, e.g., via a serial peripheral interface (SPI). This flash device may provide for non-volatile storage of system software, including a basic input/output software (BIOS) as well as other firmware of the system.

Various input/output (IO) devices may be present within system 1100. Specifically shown in the embodiment of FIG. 9 is a display 1124 which may be a high definition LCD or LED panel configured within a lid portion of the chassis. This display panel may also provide for a touch screen 1125, e.g., adapted externally over the display panel such that via a user's interaction with this touch screen, user inputs can be provided to the system to enable desired operations, e.g., with regard to the display of information, accessing of information and so forth. In one embodiment, display 1124 may be coupled to processor 1110 via a display interconnect that can be implemented as a high performance graphics interconnect. Touch screen 1125 may be coupled to processor 1110 via another interconnect, which in an embodiment can be an I2C interconnect. As further shown in FIG. 9, in addition to touch screen 1125, user input by way of touch can also occur via a touch pad 1130 which may be configured within the chassis and may also be coupled to the same I2C interconnect as touch screen 1125.

For perceptual computing and other purposes, various sensors may be present within the system and can be coupled to processor 1110 in different manners. Certain inertial and environmental sensors may couple to processor 1110 through a sensor hub 1140, e.g., via an I2C interconnect. In the embodiment shown in FIG. 9, these sensors may include an accelerometer 1141, an ambient light sensor (ALS) 1142, a compass 1143 and a gyroscope 1144. Other environmental sensors may include one or more thermal sensors 1146 which may couple to processor 1110 via a system management bus (SMBus) bus, in one embodiment.

Also seen in FIG. 9, various peripheral devices may couple to processor 1110 via a low pin count (LPC) interconnect. In the embodiment shown, various components can be coupled through an embedded controller 1135. Such components can include a keyboard 1136 (e.g., coupled via a PS2 interface), a fan 1137, and a thermal sensor 1139. In some embodiments, touch pad 1130 may also couple to EC 1135 via a PS2 interface. In addition, a security processor such as a trusted platform module (TPM) 1138 in accordance with the Trusted Computing Group (TCG) TPM Specification Version 1.2, dated Oct. 2, 2003, may also couple to processor 1110 via this LPC interconnect.

System 1100 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a near field communication (NFC) unit 1145 which may communicate, in one embodiment with processor 1110 via an SMBus. Note that via this NFC unit 1145, devices in close proximity to each other can communicate. For example, a user can enable system 1100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

As further seen in FIG. 9, additional wireless units can include other short range wireless engines including a WLAN unit 1150 and a Bluetooth unit 1152. Using WLAN unit 1150, Wi-Fi™ communications in accordance with a given Institute of Electrical and Electronics Engineers (IEEE) 802.11 standard can be realized, while via Bluetooth unit 1152, short range communications via a Bluetooth protocol can occur. These units may communicate with processor 1110 via, e.g., a USB link or a universal asynchronous receiver transmitter (UART) link. Or these units may couple to processor 1110 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications, e.g., according to a cellular or other wireless wide area protocol, can occur via a WWAN unit 1156 which in turn may couple to a subscriber identity module (SIM) 1157. In addition, to enable receipt and use of location information, a GPS module 1155 may also be present. Note that in the embodiment shown in FIG. 9, WWAN unit 1156 and an integrated capture device such as a camera module 1154 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 1160, which may couple to processor 1110 via a high definition audio (HDA) link. Similarly, DSP 1160 may communicate with an integrated coder/decoder (CODEC) and amplifier 1162 that in turn may couple to output speakers 1163 which may be implemented within the chassis. Similarly, amplifier and CODEC 1162 can be coupled to receive audio inputs from a microphone 1165 which in an embodiment can be implemented via dual array microphones to provide for high quality audio inputs to enable voice-activated control of various operations within the system. Note also that audio outputs can be provided from amplifier/CODEC 1162 to a headphone jack 1164. Although shown with these particular components in the embodiment of FIG. 9, understand the scope of the present invention is not limited in this regard.

The following examples pertain to further embodiments.

In one example, a SoC comprises a fabric to interconnect a plurality of agents of the SoC, the fabric including, a data buffer including a plurality of entries each to store data to be transferred to and from the plurality of agents, and to and from a memory coupled to the SoC, and an arbitration logic to enable a plurality of memory requests associated with data in one of the plurality of entries to be accepted after the fabric has invalidated the data in at least one cache memory of a first agent of the plurality of agents.

In an example, the SoC further comprises an ownership indicator associated with each of the plurality of entries of the data buffer, wherein the ownership indicator is of a first state to indicate that corresponding data of the entry has been invalidated in caching agents of the plurality of agents.

In an example, the arbitration logic is to update the ownership indicator to the first state when a first snooped memory request associated with data of a first entry of the data buffer retires.

In an example, the arbitration logic is to accept one or more subsequent memory requests associated with the data of the first entry before the first snooped memory request retires.

In an example, the one or more subsequent memory requests are from the same requester as the first snooped memory request.

In an example, the arbitration logic is to downgrade the one or more subsequent memory requests from snooped memory requests to unsnooped memory requests.

In an example, the first agent comprises a caching agent, and the plurality of memory requests are received from a non-caching agent of the plurality of agents.

In an example, the arbitration logic is to downgrade a snooped memory request from the non-caching agent to an unsnooped memory request and to communicate data associated with the snooped memory request to the non-caching agent without issuance of a snoop request to caching agents of the plurality of agents.

In an example, the arbitration logic comprises a temporal snoop filter, the temporal snoop filter inclusive with respect to the data buffer and non-inclusive with respect to one or more cache memories of the SoC.

In another example, a method comprises receiving a first snooped memory request for a first address in a coherent fabric of a processor from a non-caching agent of the processor, detecting if an entry of a data buffer of the coherent fabric associated with the first address is owned by the coherent fabric, and if so, downgrading the first snooped memory request to an unsnooped memory request.

In an example, the method further comprises if the entry is not owned by the coherent fabric, accepting and downgrading the first snooped memory request if the first snooped memory request is from a same requester as a pending snooped memory request for the first address.

In an example, the method further comprises accepting and downgrading the first snooped memory request before snoop processing for the pending snooped memory request is completed.

In an example, while the unsnooped memory request is pending, one or more subsequent memory requests to the address are accepted from a same requester of the first snooped memory request.

In an example, downgrading the first snooped memory request comprises converting the first snooped memory request to the unsnooped memory request.

In an example, the method further comprises if the entry of the data buffer is not owned by the coherent fabric, determining if an active memory request is pending for the entry, and if no active memory request is pending for the entry, accepting the first snooped memory request and performing an invalidating snoop request to one or more caching agents of the processor.

In an example, the method further comprises if an active memory request is pending for the entry, stalling the first snooped memory request.

In an example, the method further comprises setting an owned indicator for the entry to indicate that the coherent fabric owns the entry responsive to retirement of the first snooped memory request, and clearing the owned indicator for the entry responsive to allocating an entry in the data buffer.

In an example, the method further comprises holding return data associated with the unsnooped memory request in the data buffer until prior snooped invalidations from a requester of the first snooped memory request have completed.

In another example, a computer readable medium including instructions is to perform the method of any of the above examples.

In another example, an apparatus comprises means for performing the method of any one of the above examples.

In another example, a system comprises a SoC including a first core and a first cache memory, at least one memory controller to couple to a DRAM, a first non-caching agent, a fabric to couple the first core, the first non-caching agent and the at least one memory controller, the fabric including a data buffer and temporal snoop filter logic inclusive with the data buffer and non-inclusive with the first cache memory, the temporal snoop filter logic to enable a plurality of snooped memory requests to a first address from the first non-caching agent to be accepted without a stall when an indicator associated with the first address indicates that the fabric has control of the first address, and the DRAM coupled to the SoC.

In an example, the temporal snoop filter logic is to be enabled according to a basic input/output system (BIOS), firmware or other software.

In an example, the temporal snoop filter is to enable the plurality of snooped memory requests to be accepted after the fabric has invalidated data associated with the first address in the first cache memory.

In an example, the indicator is to indicate that the fabric has control of the first address after the data associated with the first address has been invalidated.

In an example, the temporal snoop filter logic is to update the indicator when a first snooped memory request associated with the first address retires, and wherein the temporal snoop filter logic is to accept one or more subsequent memory requests associated with the first address before the first snooped memory request retires.

In an example, the temporal snoop filter logic is to downgrade the one or more subsequent memory requests from snooped memory requests to unsnooped memory requests.

In another example, an apparatus comprises a conflict detection logic to receive a plurality of memory requests from an arbiter of a coherent fabric of a system on a chip (SoC), the conflict detection logic including snoop filter logic to downgrade a first snooped memory request for a first address to an unsnooped memory request when an indicator associated with the first address indicates that the coherent fabric has control of the first address.

In an example, the snoop filter logic is inclusive with respect to a buffer of the coherent fabric and is non-inclusive with respect to one or more cache memories of the SoC.

In an example, the snoop filter logic is to enable a plurality of memory requests associated with the first address to be accepted after the coherent fabric has invalidated data in a plurality of cache memories of a first agent of the SoC and before the unsnooped memory request has retired.

In an example, the snoop filter logic is to update the indicator to indicate that the coherent fabric has control of the first address responsive to retirement of a snooped memory request to the first address.

In an example, the snoop filter logic comprises a temporal snoop filter.

In an example, the temporal snoop filter is inclusive with a data buffer of the coherent fabric and is non-inclusive with respect to one or more cache memories of the SoC.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on a chip (SoC) comprising:
    a fabric to interconnect a plurality of agents of the SoC, the fabric comprising:
        a data buffer including a plurality of entries each to store data to be transferred to and from the plurality of agents, and to and from a memory coupled to the SoC, an ownership indicator associated with each of the plurality of entries of the data buffer, wherein the ownership indicator is of a first state to indicate that corresponding data of the entry has been invalidated in caching agents of the plurality of agents; and
        an arbitration logic to enable a plurality of memory requests associated with data in one of the plurality of entries to be accepted after the fabric has invalidated the data in at least one cache memory of a first agent of the plurality of agents, wherein the arbitration logic is to update the ownership indicator to the first state when a first snooped memory request associated with data of a first entry of the data buffer retires.

2. The SoC of claim 1, wherein the arbitration logic is to accept one or more subsequent memory requests associated with the data of the first entry before the first snooped memory request retires.

3. The SoC of claim 2, wherein the one or more subsequent memory requests are from the same requester as the first snooped memory request.

4. The SoC of claim 2, wherein the arbitration logic is to downgrade the one or more subsequent memory requests from snooped memory requests to unsnooped memory requests.

5. The SoC of claim 1, wherein the first agent comprises a caching agent, and the plurality of memory requests are received from a non-caching agent of the plurality of agents.

6. The SoC of claim 5, wherein the arbitration logic is to downgrade a snooped memory request from the non-caching agent to an unsnooped memory request and to communicate data associated with the snooped memory request to the non-caching agent without issuance of a snoop request to caching agents of the plurality of agents.

7. The SoC of claim 1, wherein the arbitration logic comprises a temporal snoop filter, the temporal snoop filter inclusive with respect to the data buffer and non-inclusive with respect to one or more cache memories of the SoC.

8. A method comprising:
    receiving a first snooped memory request for a first address in a coherent fabric of a processor from a non-caching agent of the processor;

detecting if an entry of a data buffer of the coherent fabric associated with the first address is owned by the coherent fabric; and
if so, downgrading the first snooped memory request to an unsnooped memory request.

9. The method of claim 8, further comprising if the entry is not owned by the coherent fabric, accepting and downgrading the first snooped memory request if the first snooped memory request is from a same requester as a pending snooped memory request for the first address.

10. The method of claim 9, further comprising accepting and downgrading the first snooped memory request before snoop processing for the pending snooped memory request is completed.

11. The method of claim 9, further comprising if the entry of the data buffer is not owned by the coherent fabric, determining if an active memory request is pending for the entry, and if no active memory request is pending for the entry, accepting the first snooped memory request and performing an invalidating snoop request to one or more caching agents of the processor.

12. The method of claim 11, further comprising setting an owned indicator for the entry to indicate that the coherent fabric owns the entry responsive to retirement of the first snooped memory request, and clearing the owned indicator for the entry responsive to allocating an entry in the data buffer.

13. The method of claim 8, further comprising, while the unsnooped memory request is pending, accepting one or more subsequent memory requests to the first address from a same requester of the first snooped memory request.

14. The method of claim 8, further comprising holding return data associated with the unsnooped memory request in the data buffer until prior snooped invalidations from a requester of the first snooped memory request have completed.

15. A system comprising:
a system on a chip (SoC) including:
a first core and a first cache memory;
at least one memory controller to couple to a dynamic random access memory (DRAM);
a first non-caching agent;
a fabric to couple the first core, the first non-caching agent and the at least one memory controller, the fabric including a data buffer and temporal snoop filter logic inclusive with the data buffer and non-inclusive with the first cache memory, the temporal snoop filter logic to enable a plurality of snooped memory requests to a first address from the first non-caching agent to be accepted without a stall when an indicator associated with the first address indicates that the fabric has control of the first address; and
the DRAM coupled to the SoC.

16. The system of claim 15, wherein the temporal snoop filter logic is to be enabled according to a basic input/output system (BIOS), firmware or other software.

17. The system of claim 15, wherein the temporal snoop filter is to enable the plurality of snooped memory requests to be accepted after the fabric has invalidated data associated with the first address in the first cache memory.

18. The system of claim 17, wherein the indicator is to indicate that the fabric has control of the first address after the data associated with the first address has been invalidated.

19. The system of claim 15, wherein the temporal snoop filter logic is to update the indicator when a first snooped memory request associated with the first address retires, and wherein the temporal snoop filter logic is to accept one or more subsequent memory requests associated with the first address before the first snooped memory request retires.

20. The system of claim 19, wherein the temporal snoop filter logic is to downgrade the one or more subsequent memory requests from snooped memory requests to unsnooped memory requests.

21. An apparatus comprising:
a conflict detection logic to receive a plurality of memory requests from an arbiter of a coherent fabric of a system on a chip (SoC), the conflict detection logic including snoop filter logic to downgrade a first snooped memory request for a first address to an unsnooped memory request when an indicator associated with the first address indicates that the coherent fabric has control of the first address.

22. The apparatus of claim 21, wherein the snoop filter logic is inclusive with respect to a buffer of the coherent fabric and is non-inclusive with respect to one or more cache memories of the SoC.

23. The apparatus of claim 21, wherein the snoop filter logic is to enable a plurality of memory requests associated with the first address to be accepted after the coherent fabric has invalidated data in a plurality of cache memories of a first agent of the SoC and before the unsnooped memory request has retired.

* * * * *